(12) United States Patent
Hernández Carbajal et al.

(10) Patent No.: US 10,975,185 B2
(45) Date of Patent: Apr. 13, 2021

(54) DEMULSIFIERS FOR CRUDE OIL BASED ON ACRYLIC-AMINOACRYLIC RANDOM COPOLYMERS OF CONTROLLED MOLECULAR MASS

(71) Applicant: INSTITUTO MEXICANO DEL PETRÓLEO, Mexico City (MX)

(72) Inventors: Edgar Iván Hernández Carbajal, Mexico City (MX); César Andrés Flores Sandoval, Mexico City (MX); Fernando Álvarez Ramírez, Mexico City (MX); Alfonso López Ortega, Mexico City (MX); Rodrigo De Jesús García Jiménez, Mexico City (MX); Gerardo Zavala Olivares, Mexico City (MX); Juan de la Cruz Clavel López, Mexico City (MX); Flavio Salvador Vázquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 260 days.

(21) Appl. No.: 15/726,793

(22) Filed: Oct. 6, 2017

(65) Prior Publication Data

US 2018/0162975 A1    Jun. 14, 2018

(30) Foreign Application Priority Data

Dec. 8, 2016 (MX) .......................... A/2016/016226

(51) Int. Cl.
*B01D 17/02* (2006.01)
*C08F 220/18* (2006.01)
(Continued)

(52) U.S. Cl.
CPC .......... *C08F 220/18* (2013.01); *B01D 17/047* (2013.01); *C10G 33/04* (2013.01);
(Continued)

(58) Field of Classification Search
CPC ..... C10G 33/04; B01D 17/047; C08F 220/34; C08F 220/18; C08F 2800/20
See application file for complete search history.

(56) References Cited

U.S. PATENT DOCUMENTS 5,560,832 A * 10/1996 Sivakumar ............. B01D 17/00
                                                          210/708
5,693,216 A * 12/1997 Hart ..................... B01D 17/047
                                                          208/188

(Continued)

FOREIGN PATENT DOCUMENTS

MX         338861 B  *  4/2016

OTHER PUBLICATIONS

Gallegos. "Nuevo Proceso de deshidratado de petroleo empleando copolimeros acrilos aleatorios". Thesis. Sep. 2016.*

*Primary Examiner* — Michael A Salvitti
(74) *Attorney, Agent, or Firm* — Dickinson Wright PLLC

(57) ABSTRACT

Nowadays, one of the major problems of the oil industry is the presence of large amounts of water and salts, which cannot be efficiently removed by conventional dehydrating polymers. In addition, the acid stimulation operations of petroleum wells cause the chemical degradation of demulsifiers such as polyethers and phenolic resins, reducing drastically their efficiency as water and salt removers. Based on aforementioned, a series of new copolymers has been developed; these copolymers are combinations of an acrylic and an aminoacrylic monomer and they are synthesized by semi-continuous emulsion polymerization (under starved feed conditions), which ensures both the homogeneity of the different chains as well as the randomness of the monomers distribution. The solutions of one of these random copolymers have shown an efficiency similar or superior to combinations of two or three block copolymers (formulations), when they are applied in light or heavy crude oils. The (Continued)

acrylic-aminoacrylic copolymers show good performance as water/oil emulsion breaker initiators, coalescence agents of water droplets and clarifiers of the remaining aqueous phase. In addition, the chemical structure of the acrylic copolymers confers resistance to degradation induced by abrupt pH changes when acid stimulation operations of wells are performed.

14 Claims, 8 Drawing Sheets

(51) Int. Cl.
*B01D 17/04* (2006.01)
*C10G 33/04* (2006.01)

(52) U.S. Cl.
CPC .. *C08F 220/1804* (2020.02); *C08F 220/1806* (2020.02); *C08F 220/1811* (2020.02); *C08F 2800/20* (2013.01); *C10G 2300/201* (2013.01)

(56) References Cited

U.S. PATENT DOCUMENTS

| | | | | |
|---|---|---|---|---|
| 9,120,885 | B2* | 9/2015 | Castro Sotelo | C09K 8/524 |
| 10,793,783 | B2* | 10/2020 | Flores Sandoval | C08F 220/34 |
| 2007/0244248 | A1* | 10/2007 | Behles | C08F 2/24 524/555 |
| 2011/0067295 | A1* | 3/2011 | Castro Sotelo | C10L 10/16 44/393 |
| 2011/0257328 | A1* | 10/2011 | Debord | B01D 17/047 524/555 |
| 2014/0243464 | A1* | 8/2014 | Debord | B01D 17/047 524/377 |
| 2015/0157961 | A1* | 6/2015 | Cevada Maya | C10G 29/22 524/379 |
| 2017/0015897 | A1* | 1/2017 | Hernandez Carbajal | C10G 33/04 |
| 2017/0275536 | A1* | 9/2017 | Jakubowski | C08F 20/34 |
| 2018/0162975 | A1* | 6/2018 | Hernandez Carbajal | B01D 17/047 |
| 2019/0276750 | A1* | 9/2019 | Flores Sandoval | C08F 220/18 |

* cited by examiner

DEMULSIFIERS FOR CRUDE OIL BASED ON ACRYLIC-AMINOACRYLIC RANDOM COPOLYMERS OF CONTROLLED MOLECULAR MASS

CROSS REFERENCE TO RELATED APPLICATIONS

This application claims the benefit of Mexican Patent Application No. MX/a/2016/016226 filed Dec. 8, 2016, the entire contents of which are incorporated herein by reference.

TECHNICAL FIELD OF THE INVENTION

The present invention corresponds to the field of chemical products for petroleum conditioning, particularly to demulsifiers. This invention is related to the application of copolymers based on alky acrylate-aminoalkyl acrylate monomers to control the formation of water-in-oil (W/O) emulsions, in order to remove water and salts (dissolved in the aqueous phase) from triphasic separation units and for crude oils with densities between 10 and 40° API.

BACKGROUND OF THE INVENTION

The removal of large amounts of water and salts is one of the major problems of petroleum industry. Emulsified water must be counted among the contaminants of crude oil. Salt may be dissolved in congenital water and dispersed as granules produced by the erosion of saline domes during the petroleum extraction. Nowadays, increasingly heavier crude oils, with larger amounts of resins and asphaltenes, are obtained and emulsions with smaller water droplets are formed because they are stabilized by the aromatic compounds. One of the most common methods to destabilize water/oil emulsions and to remove the salts dissolved in water is the addition of chemical compounds with surfactant properties.

Currently, the extraction of heavy and extra-heavy crude oils carrying extremely stable emulsions, along with the fall of oil prices, make necessary the development of demulsifying more efficient chemical treatments, capable of removing larger amounts of water and salts at lower prices.

These chemical treatments consist of injecting the dehydrating agent into the three-phase separators or, in some cases, at the bottom of the well, in order to achieve the longest contact time with the emulsion. Dehydrating agents are often a mixture of amphiphilic surfactants dissolved in an aromatic hydrocarbon solvent (benzene, toluene, and xylene), dispersed by diffusion and convection in crude oil and adsorbed at the water/oil interface of the water drops. The processes of adsorption and displacement and, therefore, the effectiveness of demulsifiers, depends on their chemical structure, pH of the aqueous phase, salt content and temperature. To ensure a good performance of demulsifier agent, the following features must be accomplished: dissolution of the continuous oil phase, diffusion at the oil/water interphase (considering that that the concentration of demulsifier is low), suppression of the interfacial tension gradient and moisturizing and subsequent incorporation of the solids in the removed water. However, the design of demulsifier chemical products depends on the features of crude oils, which are unique for each field and present specific emulsification problems, so the demulsifier must be adapted to every well. An appropriate selection of chemical products in a good proportion is required for an optimal treatment, although it is difficult to standardize a dosage interval.

The main chemical products currently used as crude oil demulsifiers and some application properties are summarized in Table 1.

TABLE 1

Chemical products currently use as demulsifiers.

| Product | Demulsifier property |
|---|---|
| Polyethers | Good demulsifiers that cause a slow settling of water droplets, but overdosing leads to the formation of inverse emulsions (O/W). |
| Resins | Good demulsifiers that cause a rapid settling of water droplets and separate water comes out clean. |
| Polyglycols | These compounds require mixing with other chemical products for application. |
| Di-epoxides | Excellent demulsifiers but causing a slow settling of water droplets. |
| Urethanes | Excellent demulsifiers but causing a slow settling of water droplets. |
| Polyalkylenes | Poor demulsifiers, slow settling of water droplets. |
| Sulfonates | Good humectants of solids and these have the capacity to settle water droplets, overdosing does not cause inverse emulsions (O/W), but these can cause precipitation of iron sulphide particles in the separated water. |
| Polyamines | Slow effects on the settling of water drops. |
| Alkanolamines | Fast effects on the settling of water drops. |
| Polyesters | Good demulsifiers that cause a slow settling of water droplets, but overdosing leads to the formation of inverse emulsions (O/W). |
| Polyesteramines | They are agents of surface active; hydrating at low dosages, overdosing produces inverse emulsions (O/W). |
| Oxialkylates | Good hydrating agents used in mixtures. |

By far, chemical compounds with largest range of application are the polyethers, mainly those who possess a block structure with a central sequence of hydrophobic propylene polyoxide and chain ends with sequences of hydrophilic ethylene oxide. Hydrophobic blocks in such copolymers ensure their dissolution and diffusion in crude oil, whereas hydrophilic blocks allow the destabilization of the water/oil emulsion interface. Among the main background of application of this compounds family, can be mentioned the U.S. Pat. No. 2,425,845 [1] and U.S. Pat. No. 3,334,038 [2], which protect the production process of EO-PO-EO copolymers, indicating the use as initiators of the polymerization of the central sequence of propylene polyoxide, salts derived from the following alcohols: ethylenglycol, 1,2-propylenglycol, 1,3-propylenglycol, butylenglycols, diethylenglycol, dipropylenglycol, triethylenglycol, tripropylenglycol, as well as other aliphatic glycols.

Theoretical and experimental studies have allowed stablishing that the performance of dehydrating copolymers depends on molecular parameters such as: a) chemical structure, b) composition and c) molecular mass (length of the polymeric chain). This last parameter was studied experimentally by Cendejas et al. [3], who observed that copolymers of low molecular mass are more effective for dehydrating light crude oils, whereas copolymers of greater molecular mass are required to demulsify efficiently heavy crude oils. Indeed, there is an optimal molecular mass to achieve the best petroleum dehydrating. On the other hand, the mechanism by which the block copolymers achieve to destabilize an emulsion has been elucidated through theoretical methods by Alvarez et al. [4].

Another American patent, U.S. Pat. No. 3,835,060 [5], reports a similar technology of polyethers application, which consists of breaking the crude oil emulsion, using a combination of alkyl ether sulfates and block copolymers of polyoxiethylene-polyoxipropylene, where R represents alkyl groups, n=1-10 and M is an alkaline metal, alkaline earth metal or a quaternary nitrogen (see formula 1, alkyl ether sulfate of polyglycol). It is reported that, after dosing the mixture in a range of 20-140 ppm, the breakdown of emulsion starts at 120 minutes, reaching a removal of 35% of emulsified water; however, the type of oil used and its characteristics were not reported.

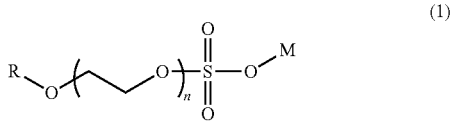

(1)

U.S. Pat. No. 5,445,765 [6] claims the rights over the demulsifier products of the type of polyethylenamines alkoxylated with propylene oxide and ethylene oxide, which were evaluated in a certain crude oil extracted in West Africa, at dosages from 0.1 until 200 ppm, in a range of temperatures between 10 and 130° C., reaching a removal of 47% of emulsified water after 3 h.

U.S. Pat. No. 5,609,794 [7] protects the use of polyalkylglycol and ethylene oxide adduct, which is esterified with an anhydride to form a diester, which is subsequently to make react with vinyl monomers and so on, until form different esters. Formulations are applied in a range of temperature from 7 to 80° C., in concentration from 10 to 1500 ppm and it is dosed to crude oil (without specifying whom) and in different currents (turbosine, gasoline, lubricants oil and others). This document mentions that water removed reaches 40 vol. % in some minutes, without specifying the exact interval of time.

The use of vinyl polymers as demulsifiers of water/oil or oil/water emulsions has been reported in literature. For example, it is known that homopolymers and copolymers of monoalylamines have been employed to break up in water emulsions in a synthetic oil, prepared using as dispersed phase a commercial motor oil SAE 10W30 and as stabilizing agents a mixture of dodecyl and tetradecyl alcohols (U.S. Pat. No. 4,614,593 [8], demulsifying of oil-in-water emulsions).

The application of water-dispersible terpolymers to remove emulsified oils in wastewater, mainly to purify wastewaters that have organic contaminants, has also been proposed. Terpolymers were synthesized starting from acrylamide, 3-acrylamido-propylmethylamonium or hydrophobic monomers such as alkylacrylamides (U.S. Pat. No. 4,741,835 [9], oil-in-water emulsion breaking with hydrophobically functionalized cationic polymers).

Although in both references (U.S. Pat. No. 4,614,593 [10] and U.S. Pat. No. 4,741,835 [9]) could be observed surfactant properties of vinyl polymers and polyacrylamides, the emulsions employed for evaluation are much easier to destabilize that water-in-oil emulsions stabilized by asphaltenes.

It has also been reported that copolymers based on chains of lipophilic no-ionic monomers and ammonium salts are effective to break up or to inhibit the formation of oil-in-water or water-in-oil emulsions in the desalting process of California crude oils (138<T<150° C.). Copolymers comprise a cationic monomer as 2-acryloyloxyethyltrimethyl ammonium chloride and a no-ionic lipophilic unit of type methyl methacrylate, butyl acrylate, n-isopropylacrylamide and N,N-dimethylacrylamide (U.S. Pat. No. 5,921,912 [11], copolymer formulations for breaking oil-in-water emulsions). The copolymers, obtained by solution or emulsion polymerization, are water soluble, so they could be applied directly in emulsions of the type crude oil-in-water. However, the copolymers hydrophilicity make their dosage in crude oil (to break up water-in-oil emulsions) very difficult, and the previous formation of an emulsion of the aqueous solution of the copolymers dispersed in some organic solvent, with the aid of another polymeric surfactant, is necessary. The difficulty to disperse these copolymers directly in crude oil complicates their application as destabilizers of water-in-oil emulsion. On the other hand, it is well known that one of the main factors that determines the efficiency of a demulsifier is its molecular mass [3], [4]. In the aforementioned U.S. Pat. No. 5,921,912 [11] is reported a range of application between Mn 20,000 and 20,00,000 g/mol, but any mechanism or procedure to control of the copolymers molecular mass during the solution or emulsion was not mentioned.

In a similar way, U.S. Pat. No. 5,730,905 [12] (Method of resolving oil and water emulsions) reports the inhibitor and suppressor effects of the formation of water/oil and oil/water emulsions (138<T<150° C.). Copolymers comprise a combination of acrylamide and 2-acryloxyethyltrimethylammonium chloride. The authors pointed out that their copolymers have application in the desalting of Californian crude oils, under refinery conditions, for emulsions that contain between 2 and 50% of crude oil, at 150° C. It is important to emphasize that with these amount of oil, oil/water emulsions are mainly formed. As in the previous case, demulsifying temperature is very high (150° C.). By another way, it is well known that one of the main factors that determines the efficiency of demulsifiers is their molecular mass [3], [4]. However, in U.S. Pat. No. 5,730,905 [12] is reported that copolymers are synthesized in a very broad range of molecular mass (from 2 000 000 to 40 000 000 g/mol). Such copolymers are difficult to handle, because of their high viscosity and must be dissolved in water. Such materials can be applied into a water/oil emulsion, as in the case of U.S. Pat. No. 5,921,912 [11], only if an aqueous solution is previously emulsified in an organic solvent. Finally, it should be emphasized that these demulsifier copolymers are prepared by inverse emulsion polymerization, losing the advantage of use water as dispersion medium.

A more efficient demulsifier system is reported in U.S. Pat. No. 5,607,574 [13] (Method of breaking reverse emulsions in crude oil desalting system) and it consists of adding into emulsions containing between 51 and 99% of oil, in a high range of temperature (65<T<150° C.), a combination of aluminum chlorohydrate and polyamines.

On the other hand, in U.S. Pat. No. 5,156,767 [14] (Emulsion breaking using alkylphenol-polyethylene oxide-acrylate polymer coated coalescer material) is reported that polymers, having an alkylphenol, ethylene oxide and an acrylic monomer, which are efficient as destabilizers of water-in-oil emulsions. Such polymers were evaluated in a mixture of Hutton crude oil and brine of Tisdale field.

Xu Wei et al. reported in 2011, in the CN Patent 101255354 B [15] (Non-polyether type thick oil demulsifying agent and preparation thereof), the use of copolymers of butyl acrylate and acrylic acid as demulsifiers of crude oil. These copolymers were prepared by solution polymerization, using an organic solvent as dispersion medium and an initiator, as the bis-azobutyronitrile, soluble in the organic phase. Authors [15] mention problems to control the homogeneity of the synthesized copolymers, so the monomers had to be added in portions (batch method) or by dropping (no specific controls of addition feed are mentioned). Inventors don't either report either the control of molecular mass for specific applications in different types of crude oils. Finally, Xu Wei et al. ensured a good breaking capacity and a remarkable clarification of the aqueous phase using these copolymers.

The use as demulsifiers of synthesized copolymers based on acrylic monomers and oxyalkylates (derivatives of ethylene oxide, propylene oxide, etc.). is detailed in U.S. Pat. No. 5,472,617 [16] (Method of demulsifying crude oil and water mixtures with copolymers of acrylates or methacrylates and hydrophilic comonomers) The process of synthesis of these copolymers is complex, because it involves several stages to prepare the comonomers and, once obtained the copolymers, these are submitted to further changes. In the elaboration of these materials are employed organic solvents such as xylene and toluene. The assessment as demulsifiers of these copolymer was determined in crude oils from north Germany, the North Sea, the Gulf States of U.S., the Near and Middle East, as well as Africa. However, in none of those cases the API degrees of crude oils are mentioned, in spite this characteristic is fundamental to estimate the real efficiency as demulsifiers of block copolymers.

One of the properties that a demulsifier must provide is the clarification of the aqueous phase, i.e., the removal of residual amounts of oil in the remaining water. In EP 595156A1 Patent [17] (New dispersion polymers for oil field water clarification) is claimed the use of polymers based on the copolymerization of water-soluble monomers derivatives of quaternary ammonium salts obtained from benzyl chloride and acrylates such as dimethylaminoethyl or diethylaminoethyl acrylates. The Copolymers are prepared by emulsion polymerization from a seed or "situ", using as free radical source an azo-initiator. In the document, the control of the addition feed of monomers is not mentioned. The molecular masses of the obtained copolymers are between 10 000 and 10 000 000 g/mol. Authors point out that they did not find an influence of the copolymer molecular weight on their clarifying power of the water phase produced in oil fields. It is not mentioned in the document that the water-soluble acrylic copolymers present properties as breakers or coalescence agents of water/oil emulsions.

In U.S. Pat. No. 5,100,582 [18] is claimed the use of a tetrapolymer of methyl methacrylate, butyl acrylate, acrylic acid and methacrylic acid, as well as a pentapolymer synthesized from methyl methacrylate, butyl acrylate, acrylic acid, methacrylic acid and styrene as destabilizer of water/oil emulsions. Both polymers are water-soluble and were evaluated in a "crude oil replicate", i.e., a mixture of heptane and toluene. In the document, the highly stabilizing effect of asphaltenes in water/oil emulsions is not taken in account, but it is necessary to remark that the asphaltene effect was not emulated by the mixture of organic solvents used to evaluate the tetrapolymer and pentapolymer. The lipophobicity of both polymers makes very difficult their application in crude oil.

The use of vinyl-acrylic copolymers as dehydrating agents of crude oils was reported by D. Ramirez [19] (pp. 120-126). These chemical products, synthesized by emulsion polymerization, showed a high performance to remove water and salts from crude oils. DPD simulation of the system allowed demonstrating that vinyl-acrylic copolymers induce the rupture of water/oil and oil/water emulsions through a gap formation mechanism [19] (p. 136).

González Palacios [20] studied in 2015 the demulsifying effect of a series of copolymers based on two acrylic monomers. The strong influence of the polymer molecular mass on its performance as water remover was confirmed in this work and it was concluded that there is an ideal molecular weight value to achieve a maximum dehydration. However, acrylic-acrylic polymers needed to be added in large doses (>1500 ppm) in order to remove completely the aqueous phase.

Recently, Atta et al. [21] reported the use of poly ionic liquids of acrylic type to destabilize emulsions of heavy oil and water. Copolymers employed as demulsifiers were synthesized by solution polymerization, employing tetrahydrofuran as solvent. Authors observed a remarkable clarifying ability of the aqueous phase removed from the emulsion by dosed copolymers [21].

A similar case was studied by Martinez Gallegos [22], who reported in 2016 the use of copolymers of 2-carboxiethyl acrylate (F) and 2-(dimethylamino)ethyl methacrylate (E), in a ratio F/E: 50/50 and 70/30 wt %, as dehydrating agents of crude oil. Such copolymers were insoluble in organic solvents, so they had to be dissolved in water under basic conditions. Although with this copolymer, obtained from the combination of an acrylic monomer and another aminoacrylic monomer, was reached high water removals, the need to add these acrylic demulsifiers in aqueous solutions constitutes a disadvantage for their application to destabilize water/crude oil emulsions in the field. From the environmental point of view, the hydrophilicity of these acrylic-aminoacrylic copolymers (as well as those of U.S. Pat. No. 5,921,912 [11], previously analyzed) represents also a difficulty [23].

Subsequently, García Jiménez [24] reported certain random copolymers based on acrylics, unlike the previous case, which can be dissolved in organic solvents such as xylene. These compounds proved to be very efficient as water removers in both light and heavy crude oils. However, neither the chemical structures nor the contents of the monomers used to synthesize the demulsifier copolymers of crude oil have been reported anywhere in the document, being impossible to infer which combinations of the numerous acrylic monomers are capable to dehydrate crude oils. However, in that document, a theoretical study was presented, showing that the acrylics are capable of inducing the coalescence of water droplets in crude oil by means of a molecular drag mechanism.

The development of novel random copolymers of acrylic monomers and aminoacrylic with properties as breakers of water/crude oil emulsions, drop coalescers and clarifiers of the aqueous phase, is shown in the present invention. The synthesis of these dehydrating agents of crude oil was carried out by semi-continuous emulsion polymerization a process developed in the Mexican Petroleum Institute, which has shown its utility for the synthesis of other chemical products employed to condition crude oil, such as viscosity reducers [25] and defoamers [26]. In the mentioned process, emulsion polymerization was carried out under starved feed conditions, which ensures the copolymer homogeneity (no composition drifts) and a random monomer distribution in the chain. the elaboration process requires the use of chain-transfer agents, molecules that allow controlling the average molecular mass of the polymeric chains. This molecular parameter is of great importance, since the efficiency of dehydrating process of light or heavy crude oils depends largely on it. The presence of suitable amounts of acrylic monomers in the copolymer allows their dissolution in the crude oil, while the aminoacrylic units in the chain interact with the aqueous phase. The proportions of the acrylic and aminoacrylic monomers were adjusted in order to obtain copolymers soluble in the organic phase, so they can be applied directly in crude oil and without the risk of being trained by the remaining aqueous phase [23]. Unlike other demulsifiers reported in the literature, these acrylic-aminoacrylic copolymers were directly evaluated in light and heavy crude oils. Molecular characteristics of novel acrylic-aminoacrylic copolymers (composition and molecular mass) could be adjusted according to characteristic of each crude oil, optimizing their performance as dehydrating agents and thus showing a better efficiency/cost ratio than commercially available dehydrating agents.

REFERENCES

[1] Fife, H. R., and Toussaint, W. J. "Mixtures of polyoxyalkylene dials and methods of making such mixtures." U.S. Pat. No. 2,425,845. 19 Aug. 1947.
[2] Lucas, R. N. "Phase separation process." U.S. Pat. No. 3,334,038, 1 Aug. 1967.
[3] Cendejas, G., Arreguín, F., Castro, L. V., Flores E. A. and Vázquez, F., "Demulsifying super-heavy crude oil with bifunctionalized block copolymers", Fuel, 103, 356-363, (2013).
[4] Álvarez, F., Flores, E. A., Castro, L. V., Hernández, J. G., López, A. and Vázquez, F. "DPD study of water/crude oil emulsions in the presence of a functionalized copolymer", Energy & Fuels, 25 (2), 562-567, (2011).
[5] Maddox, J Tuggle, R. and Zimmerman M. "Demulsification compositions containing alkyl ether sulfates." U.S. Pat. No. 3,835,060. 10 Sep. 1974.
[6] Elfers, G., Sager, W., Vogel, H. H., & Oppenlaender, K. "Petroleum emulsion breakers." U.S. Pat. No. 5,445,765. 29 Aug. 1995.
[7] Taylor, G. N. (1997). U.S. Pat. No. 5,609,794. Washington, D.C.: U.S. Patent and Trademark Office.
[8] Roark, D. N. Demulsification of oil-in-water emulsions. U.S. Pat. No. 4,614,593. 1986.
[9] Jacques, D. F., Bock, J. and Valint, P. L. "Oil-in-water emulsion breaking with hydrophobically functionalized cationic polymers." U.S. Pat. No. 4,741,835. 3 May 1988.
[10] Roark, D. N. "Demulsification of oil-in-water emulsions." U.S. Pat. No. 4,614,593. 30 Sep. 1986.
[11] Hart, P. R., Chen, F., Liao, W. P., & Burgess, W. J. "Copolymer formulations for breaking oil-and-water emulsions." U.S. Pat. No. 5,921,912. 13 Jul. 1999.
[12] Hart, P. R., Brown, J. M. and Connors, E. J. "Method of resolving oil and water emulsions." U.S. Pat. No. 5,730,905. 24 Mar. 1998.
[13] Hart, P. R. "Method of breaking reverse emulsions in a crude oil desalting system." U.S. Pat. No. 5,607,574. 4 Mar. 1997.
[14] Fitzgerald, P. H., Wolf, N. O., Clark, C. R., & Cords, D. P. "Emulsion breaking using alkylphenol-polyethylene oxide-acrylate polymer coated coalescer material." U.S. Pat. No. 5,156,767. 20 Oct. 1992.
[15] Xu Wei, Sheng L. Z., Tian Y. F. and Chen Y. P., Non-polyether type heavy oil demulsifier and its preparation method, China patent CN 101255354 B1 May 2011.
[16] Barthold, K., Baur, R., Crema, S., Oppenlaender, K., & Lasowski, J. "Method of demulsifying crude oil and water mixtures with copolymers of acrylates or methacrylates and hydrophilic comonomers." U.S. Pat. No. 5,472,617. 5 Dec. 1995.
[17] Huang, S.-Y., Rosati, L. and Kozakiewicz, J. J. "Aqueous dispersions." U.S. Pat. No. 6,702,946. 9 Mar. 2004.
[18] Bhattacharyya, B. R. "Water soluble polymer as water-in-oil demulsifier." U.S. Pat. No. 5,100,582. 31 Mar. 1992.
[19] Ramírez D., "Estudio teórico experimental del potencial de deshidratado de crudos pesados inducido por polímeros de adición" Tesis de maestria, Instituto Mexicano del Petróleo July (2014). pp. 120-126
[20] González Palacios N., "Síntesis de copolímeros base acrilatos de alquilo vía polimerización en emulsión como agentes desemulsificantes en aceites crudos pesados mexicanos", Tesis I.Q.I., ESIQIE, IPN, Dic. (2015), pp. 66, 117-130 y 136.
[21] Atta, A. M., Al-Lohedan, H. A., & Abdullah, M. M. "Dipole poly (ionic liquids) based on 2-acrylamido-2-methylpropane sulfonic acid-co-hydroxyethyl methacrylate for demulsification of crude oil water emulsions" Journal of Molecular Liquids, 222, 680-690, (2016).
[22] Martínez Gallegos A. A., "Nuevo proceso de deshidratado de petróleo empleando copolímeros acrílicos aleatorios", Tesis I.Q.I., ESIQIE, IPN, September (2017), pp. 82-84.
[23] Bolto, B. & Gregory, J. Organic polyelectrolytes in water treatment. Water research, 41(11), 2301-2324, (2007).
[24] García Jiménez R. J., "Estudio teórico-experimental del rompimiento de emulsiones agua/petróleo mediante copolímeros base acrílicos", Tesis I.Q.I., ESIQIE, IPN, September (2017).
[25] Sotelo, L. V. C., Flores, E. A., Cendejas, G. Lozada, M. & Vázquez F. (2015). "Formulations of random polymers for improving crude petroleum flow." U.S. Pat. No. 9,120,885. 1 Sep. 2015.
[26] Cevada E., Castro L.V., Hernández E., Flores C. A., López A., Estrada A., Alvarez F. and Vazquez F. S., "Formulaciones de homopolimeros base acrilatos de alquilo empleadas como antiespumantes en aceites crudos pesados y súper pesados", Solicitud de patente mexicana MX/a/2013/014352, Dic. 6, (2013).
[27] Castro, L. V., Flores, E. A., Cendejas, G. C., Lozada, M., & Vázquez, F. (2016). "Formulación de polímeros aleatorios para mejorar flujo de crudos del petróleo. Patente Mexicana MX 338861 B.
[28] Castro L. V. and Vazquez F. S., "Copolymers as flow improvers for Mexican crude oils", Energy & Fuels, 22(6), 4006-4011 (2008).
[29] Cevada E., "Síntesis de nuevos compuestos antiespumantes libres de silicio y diseño de formulaciones antiespumantes con base en poliéteres, acrílicos y ésteres de ácidos grasos con aplicación en aceites crudos pesados", Tesis de doctorado en ingeniería, Instituto Mexicano del Petróleo, México D. F. Agosto (2015), pp. 62,63.

BRIEF DESCRIPTION OF THE DRAWINGS

Firstly, FIGS. 1 to 3 report the results of the performance of a series of copolymers based on alkyl acrylate-alkylamine acrylate monomers, used as dehydrating agents of heavy crude oil of 12.31° API. Subsequently, the results of the assessment of a second series of acrylic-amino acrylic copolymers applied in heavy crude oil of 18.77° API are shown in FIG. 4. Finally, the performance as demulsifiers of other set of acrylic-aminoacrylic copolymers dosed in light crude oil of 38.71° API is described in FIG. 5.

In Figure No. 1 is reported the performance of random copolymers based on acrylic/amino acrylic monomers, labeled in the present invention as AK371 and AK371-L, with a ratio of A-monomer of 70 wt % and K3-monomer of 30 wt %. The first copolymer, AK371, was synthesized in a semi-continuous reactor, whereas the AK371-L copolymer was obtained in batch reactor. Both random copolymers were evaluated as demulsifier agents in heavy crude oil of 12.31° API, at concentrations of 500 and 1000 ppm and compared to untreated crude oil (blank). A clear improvement of the performance as demulsifier of the AK371 copolymer, compared to the copolymer obtained in batch reactor, was observed.

Figure 1:
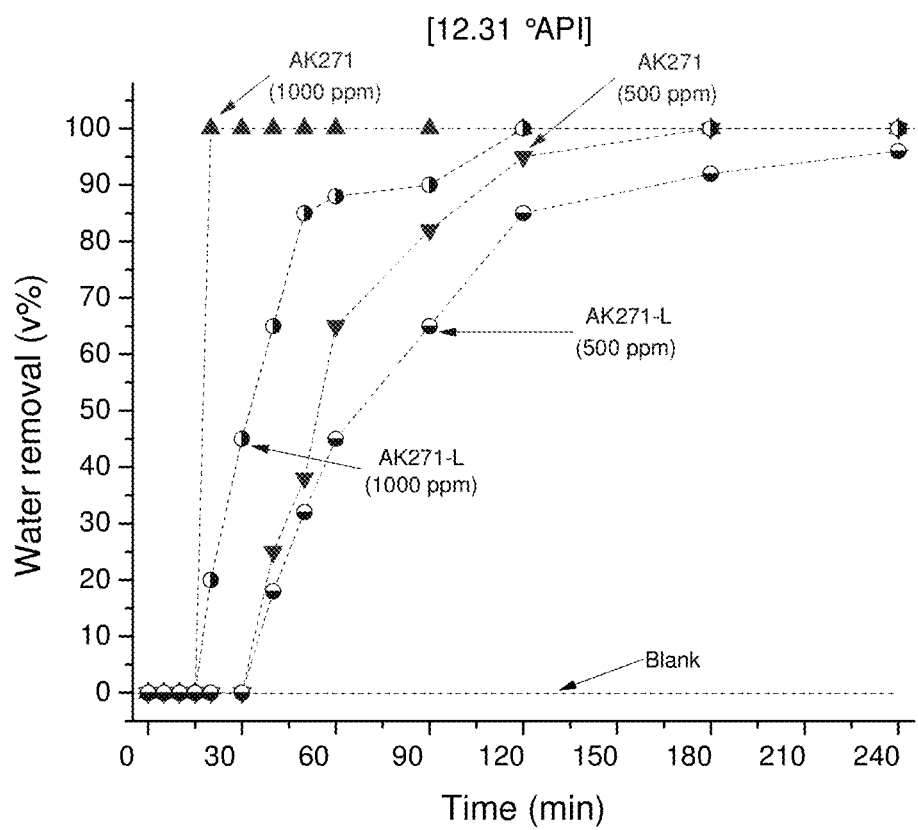

Figure No. 2 allows observing the demulsifier performance of the acrylic/amino acrylic random copolymer labeled as AK371, with a ratio of A of 70 wt % and K3 with 30 wt %, synthesized in a semi-continuous reactor, compared to the FDH-1 commercial formulation. Both were evaluated as demulsifier agents in heavy crude oil of 12.31° API, at concentrations of 500 and 1000 ppm; likewise the performance of both products were compared to the behavior of the untreated crude oil (blank).

In Figure No. 3 are shown images of the testing bottles once the dehydrating assessment ended; a) bottle dosed with the FDH-1 commercial product, at 1000 ppm, in the Ayin-09 crude oil (12.31° API) and b) bottle dosed with the AK272 acrylic/amino acrylic copolymer, at 1000 ppm, in the Ayin-09 crude oil (12.31° API).

Figure No. 4 reports the demulsifier activity of acrylic/amino acrylic random copolymers labeled as: AK261 (with a ratio of A monomer of 60 wt % and K2 monomer of 40 wt %); AK271 (with a ratio of A monomer de 70 wt % and K2 monomer of 30 wt %); AK281 (with a ratio of A monomer of 80 wt % and K2 monomer of 20 wt %); AK291 (with a ratio of A monomer of 90 wt % and K2 monomer of 10 wt %). All copolymers were synthesized by semi-continuous process and, once obtained, compared with the FDH-1 commercial formulation. The evaluation was carried out in heavy crude oil of 12.31° API at concentration of 1000 ppm; all products are compared with untreated crude oil without treatment (blank).

Figure No. 5 shows the demulsifier activity of three acrylic/amino acrylic random copolymers labeled as AK371, AK372 and AK373, with a composition of A monomer of 70 wt % and K3 monomer of 30 wt %. Molecular mass of these copolymers, obtained in semi-continuous reactor, were adjusted a different values (12160, 15430 and 24312 g/mol). Their performance as dehydrating agents of heavy crude oil of 18.77° API, at concentrations of 500 and 1000 ppm, was compared to that of FDH-1 commercial formulation. Likewise, the emulsion destabilization was compared with the colloidal stability of untreated crude oil (blank).

In Figure No. 6 are shown images of the testing bottles once ended the evaluation of dehydrating agents: a) testing bottle dosed with FDH-1 commercial product, at 500 ppm in the Ayin-04 crude oil (18.77° API) and b) testing bottle dosed with the AK272 acrylic/amino acrylic copolymer, at 500 ppm, in the Ayin-9 crude oil (18.77° API).

In Figure No. 7 is reported the demulsifier activity of a series of acrylic/amino acrylic random copolymers, labeled in the present invention as: BK171, BK172, BK173 and BK174 (all with a content of B monomer of 70 wt % and K1 amino acrylic monomer of 30 wt %). Their molecular mass were adjusted during the polymerization in semi-continuous reactor. The efficiency of these copolymers as water removers in light crude oil (38.71° API) was compared to that of the FDH-1 commercial formulation, being dosed everyone at 100 ppm. The colloidal stability of water/oil emulsion employed as blank is also reported.

Images included in Figure No. 8 show the testing bottle once ended the evaluation of two dehydrating agents: a) Testing bottle dosed with the FDH-1 commercial product, at 100 ppm, in the Ayin-01 crude oil (38.71° API) and b) Testing bottle dosed with the BK172 acrylic/amino acrylic copolymer, at 100 ppm, in the Ayin-01 crude oil (38.71° API).

DETAILED DESCRIPTION OF THE INVENTION

The present invention consists of the synthesis of random copolymers based on alkyl acrylates and amino alkyl acrylates (polymers with random sequences of two monomers in the polymeric chain) and their evaluation as dehydrating agents in crude oils with densities between 10 and 40° API.

Random copolymers based on alkyl acrylate and alkylamino acrylate as dehydrating agents were prepared employing the following method. This method is illustrative and not imply any limitation:

Random copolymers based on alkyl acrylate and alkylamino acrylates are synthesized by semi-continuous emulsion polymerization as a latex, (the synthesis method is described in Mexican patent MX 338861 B [27]). In this patent, the monomers are fed from an addition tank to the main reactor under starved feed conditions, which guarantees a higher homogeneity in the synthesized copolymers and a random distribution of the monomeric units in the chains [28]. Additionally, the semi-continuous process allows controlling the exothermy of the reaction by dosing the pre-emulsion feed to the polymerization reactor. Only for comparison, a copolymer was synthesized by emulsion polymerization in a batch reactor [29], a procedure that does not guarantees the product homogeneity nor the control of the reaction exothermy. The copolymers are prepared as latex, which is a dispersion of polymeric particles in water, easy to handle and it avoids the usage of organic solvents. Latex is dewatered by distillation at temperatures from 80 to 120° C. and, at the same time, a suitable organic solvent is added to allow its final application as demulsifying agent in crude oils with densities of 10 to 40° API, employing solvents whose boiling point falls within the range of temperature between 35 to 200° C., such as: dichloromethane, methanol, ethanol, isopropanol, chloroform, benzene and its derivatives, toluene, xylene, jet fuel, naphtha, individually or mixed. The amount of copolymer in the solution is between 10 and 50 wt %.

In scheme (2) is shown the structure of the different random copolymers based on alkyl acrylate/alkylamino acrylates, comprised in the present invention, preferably alkyl ester of acrylic acid or methacrylic acid:

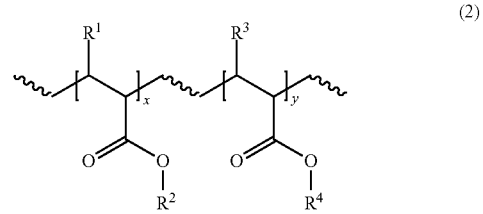

(2)

wherein:

$R^1$, $R^2$, $R^3$ and $R^4$ are independent radicals represented by the groups mentioned bellow:

$R^1$ and R3=H (hydrogen), $CH_3$ (methyl);

$R^2$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl). This aliphatic chain may contain heteroatoms of the ether group, as well as aromatic rings or rings with heteroatoms of the ether type.

$R^4$=$CH_2NH_2$ (methylamine), $CH_2CH_2NH_2$ (2-ethylamine), $CH_2CH_2CH_2NH_2$ (3-propylamine), $CH_2CH(NH_2)_2$ (2-dimethylamino), $(CH_2CH_2N(CH_3)_2)$ 2-(dimethylamino)ethyl, $(CH_2CH_2N(CH_2CH_3)_2)$ 2 (diethylamino)ethyl, $(CH_2CH_2CH_2N(CH_3)_2)$ 3-(dimethylamino)propyl, $(C_6H_{12}NO)$ N-ethylmorpholine.

Wherein, additionally:

x=is a number from 2 to 900.

y=is a number from 2 to 900.

"x" and "y" can be random sequences.

Average number molecular masses are comprised in the ranges from 1000 to 180 000 g/mol.

The following describes, by way of example, which does not imply any limitation, the monomers used in the synthesis of the copolymers, object of this invention: methyl acrylate, ethyl acrylate, butyl acrylate, n-amyl acrylate, isobornyl acrylate isobutyl acrylate, tert-butyl acrylate, hexyl acrylate, 2-ethylhexyl acrylate, 3,5,5-trimethylhexyl acrylate, 2-methoxiethyl acrylate, 2-phenoxiethyl acrylate, 4-tert-butylcyclohexyl acrylate, octyl acrylate, isodecyl acrylate, decyl acrylate, lauryl acrylate, tridecyl acrylate, octadecyl acrylate or behenyl acrylate; on the other hand, it described the alkylamino acrylates used in this invention, it does not imply any limitation: 2-ethylamino acrylate, 2-ethylamino methacrylate, 2-(dimethylamino)ethyl acrylate, 2-(dimethylamino)ethyl methacrylate, 3-propylamino acrylate, 3-(dimethylamino)propyl acrylate, 2-(diethylamino)ethyl acrylate, 2-(diethylamino)ethyl methacrylate, 2-N-ethylmopholine methacrylate.

The method consists in adding an effective amount of random copolymer, based on alkylacrylate and alkylamino acrylate, to crude oils with densities from 10 to 40° API, at concentrations between 10 and 2000 ppm, in order to induce the demulsification of aforementioned crude oils.

The present invention will be described drawing upon a specific number of examples, which are considered illustrative but do not imply any limitation. Once obtained, copolymers, based on an alkyl acrylate and an alkylamino acrylate, were characterized using the following instrumental methods:

1.—Size exclusion chromatography (SEC), in a size exclusion chromatograph Agilent® model 1100, with PLgel column and using tetrahydrofuran (THF) as eluent, to calculate the copolymer molecular mass distribution and polydispersity index (I).

2.—Fourier Transform Infrared spectroscopy (FTIR), in a FTIR spectrometer model Thermo Nicolet® AVATAR, 330 using the method of film technique with OMNIC® software, version 7.0.

The average molecular masses and polydispersity index of the copolymers based on alkyl and alkylamino acrylates are shown in Tables 2, 3 and 4; the spectroscopic characteristics of some synthesized random copolymers based on an alkyl acrylate and an alkylamino acrylate, which does not imply any limitation, are also given:

The results of the synthesis of different alkyl/amino polyacrylates ($R^1$=hydrogen, $R^2$=n-butyl, $R^3$=hydrogen, $R^4$=2-ethylamino), which does not imply any limitation, are reported in Table No. 2:

TABLE NO. 2

Weight composition (wt %), synthesis method, average number molecular mass (Mn, measured by SEC) and polydispersity index (I) of a series of acrylic-aminoacrylic copolymers synthesized as examples..

| Copolymer | Weigth ratio (wt %) | Synthesis method | Mn (g/mol) | I |
|---|---|---|---|---|
| AK271-L | 70/30 | Batch | 18900 | 3.2 |
| AK261 | 60/40 | Semi-continuous | 24147 | 2.3 |
| AK271 | 70/30 | Semi-continuous | 26269 | 2.3 |
| AK281 | 80/20 | Semi-continuous | 26540 | 2.4 |
| AK291 | 90/10 | Semi-continuous | 28002 | 2.5 |
| AK272 | 70/30 | Semi-continuous | 14132 | 1.8 |

The results of the synthesis of a series of alkyl polyacrylates (RC hydrogen, $R^2$=n-butyl, $R^3$=methyl, $R^4$=2-(dimethylamino) ethyl), which does not imply any limitation, are reported in Table No. 3:

TABLE NO. 3

Molecular mass in number (Mn), polydispersity index (I) of acrylic-aminoacrylic copolymers measured by SEC, besides its composition in weight (wt %) and synthesis method for each example.

| Copolymer | Weigth ratio (wt %) | Synthesis method | Mn (g/mol) | I |
|---|---|---|---|---|
| AK371 | 70/30 | Semi-continuous | 24312 | 2.5 |
| AK372 | 70/30 | Semi-continuous | 15430 | 2.0 |
| AK373 | 70/30 | Semi-continuous | 12160 | 1.7 |

The results of a series of alkyl polyacrylates (RC hydrogen, $R^2$=n-hexyl, $R^3$=hydrogen, $R^4$=3-aminopropyl, which does not imply any limitation, are listed in Table No. 4:

TABLE NO. 4

Molecular mass in number (Mn), polydispersity index (I) of acrylic-aminoacrylic copolymers measured by SEC, besides its composition in weight (wt %) and synthesis method for each example.

| Copolymer | Weigth ratio (wt %) | Synthesis method | Mn (g/mol) | I |
|---|---|---|---|---|
| BK171 | 70/30 | Semi-continuous | 23770 | 2.4 |
| BK172 | 70/30 | Semi-continuous | 14302 | 1.8 |
| BK173 | 70/30 | Semi-continuous | 11161 | 1.6 |
| BK174 | 70/30 | Semi-continuous | 9860 | 1.4 |

EXAMPLES

The following examples are presented to illustrate the spectroscopic characteristics of the copolymers based on alkyl acrylate and alkylamino acrylate, employed as dehydrating agents of crude oils with API densities between 10 and 40° API. These examples should not be regarded as limiting of what is claimed here.

Series AK

Random copolymer based on alkyl acrylate/alkylamino acrylate, I.R. ν $cm^{-1}$: 3395, 2959, 2938, 2873, 1732, 1589, 1457, 1380, 1251, 1164, 1098, 1066, 941, 738.

Series BK

Random copolymer based on alkyl acrylate/alkylamino acrylate, I.R. ν cm$^{-1}$: 3446, 2959, 2934, 2873, 1732, 1455, 1379, 1252, 1163, 1117, 1065, 942, 840.

Evaluation of random copolymers based on alkyl acrylate and alkylamino acrylate as dehydrating agents of crude oils with densities between 10 and 40° API.

Different concentrated solutions of each one of the synthesized copolymers were prepared, since 5 to 40 wt %, employing solvents with boiling point falling within the range of temperature from 35 to 200° C., as dichloromethane, methanol, ethanol, isopropanol, chloroform, benzene and its derivatives, toluene, xylene, jet fuel, naphtha, individually or mixed. A small volume of the solvent was added to the solution hindering that any solvent effect on the water removal from crude oil. Copolymers based on alkyl acrylate and aminoalkyl acrylate were evaluated at a concentration in the range from 10 to 2000 ppm. Polymers were simultaneously evaluated and were compared to a commercial dehydrating formulation (FDH-1), widely used in the oil industry.

The polymers composing the FDH-1 formulation are described in Table 5. It should be noted that this chemical product is a formulation of several block copolymers (polyethers), each one with a function as emulsion breaker, coalescer of water droplets in crude oil or clarifier of the aqueous phase. The fact that the dehydrating FDH-1 formulation consists of several polyethers (dehydrating basics), makes it more expensive. In contrast, acrylic/aminoacrylic copolymers were not formulated, because a single molecule has the three demulsifying functions (breaker, coalescer and clarifier), presenting a clear advantage over the commercial formulation. The integration of the three properties into a single molecule represents an advantage over the commercial formulation, since the demulsifying product is prepared in one-step reaction and a further mixing step is not required.

TABLE NO. 5

Commercial formulation FDH-1 composition, including average molecular mass Mn and composition of POP/POE wt %.
FDH-1 Formulation

| Label | Mn (g/mol) | Composition (wt %) |
|---|---|---|
| TP 89 | 7750 | 90/10 |
| TP 03 | 5330 | 70/30 |
| TP 14 | 3050 | 60/40 |
| TP 71 | 1400 | 90/10 |

The assessment procedure is described below: the number of graduated bottles, provided with inserts and covers, is indicated by the number of compounds to evaluate, and one more, corresponding to additive-free crude oil (blank) was included. Crude oil was added until the mark of 100 mL. All testing bottles were placed in a water bath with controlled temperature at 80° C. by 20 minutes. At the end of this time, one aliquot of the solution of every synthesized random copolymer and the commercial product (FDH-1) was added. All bottles were shaken during 2 minutes, at a speed of 2 blows per second. After being purged, these bottles were placed again in the thermalized bath and the breakdown of water in oil emulsion was read every 5 minutes during the first hour and, subsequently, every hour, along the evaluation time (5 h). All the copolymers of this invention and the commercial formulation were evaluated at different concentrations, in the range between 100 and 2000 ppm.

The crude oils employed to evaluate as dehydrating agents the random copolymers, based on alkyl acrylate/aminoalkyl acrylate, were characterized as follows:

TABLE NO. 6

Physicochemical characterization of crude oils

| Parameter | Ayin-01 | Ayin-04 | Ayin-09 |
|---|---|---|---|
| ° API | 38.71 | 18.77 | 12.31 |
| Sal content (lb/Mbbl) | 14.13 | 4275.00 | 2732.00 |
| Wax (wt %) | 1.35 | 3.11 | 3.90 |
| Pour point (° C.) | −27.00 | −24.00 | −15.00 |
| Distilled water (vol %) | 0.10 | 18.00 | 25.00 |
| Water and sediments (vol %) | 0.90 | 21.00 | 27.00 |
| Kinematic viscosity (mm$^2$/s) @ 25° C. | 4.87 | 993.97 | 2945.15 |
| Cryoscopy MW (g/mol) | 242.50 | 320.01 | 415.18 |
| Osmometry MW (g/mol) | 466.20 | 891.14 | 2132.11 |
| n-heptane insolubles (wt %) | 0.30 | 12.14 | 14.78 |
| SARA Analysis | | | |
| Saturates (wt %) | 52.71 | 20.38 | 20.35 |
| Aromatics (wt %) | 36.72 | 39.32 | 36.17 |
| Resins (wt %) | 9.85 | 26.71 | 26.43 |
| Asphaltenes (wt %) | 0.69 | 13.52 | 16.95 |

Figure 2:
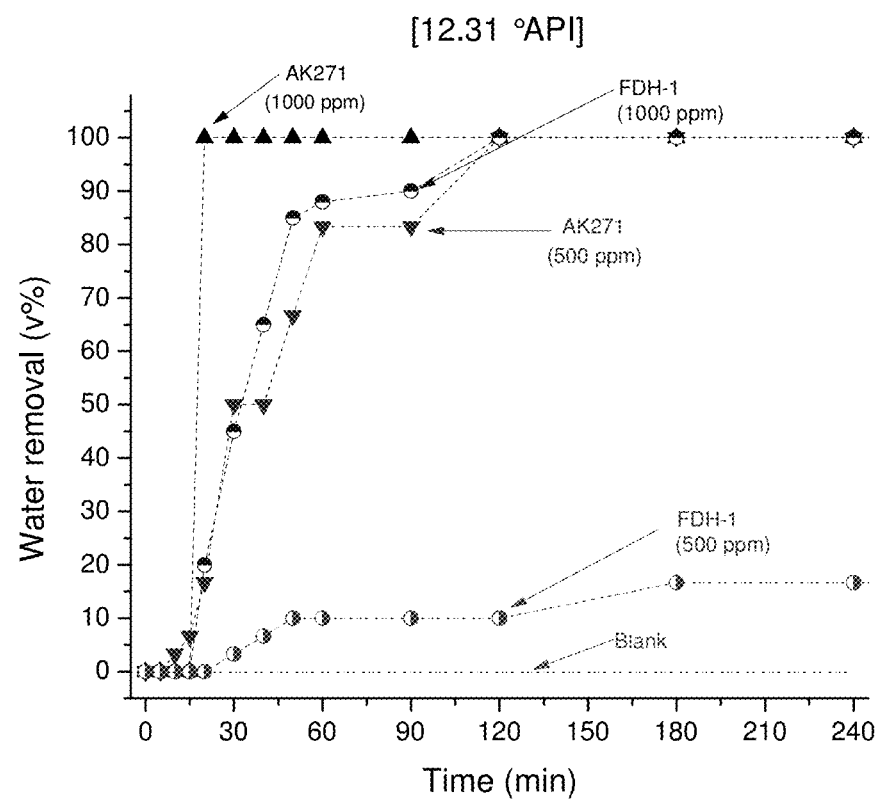
Figure 3:
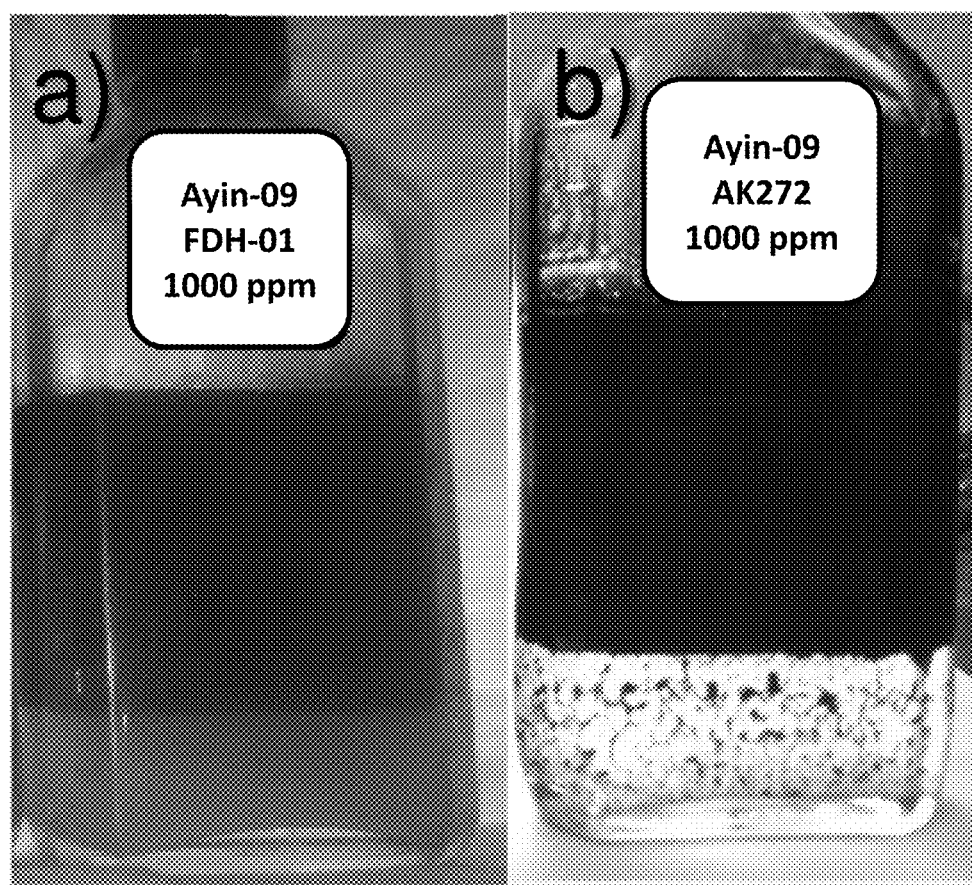
Figure 5:
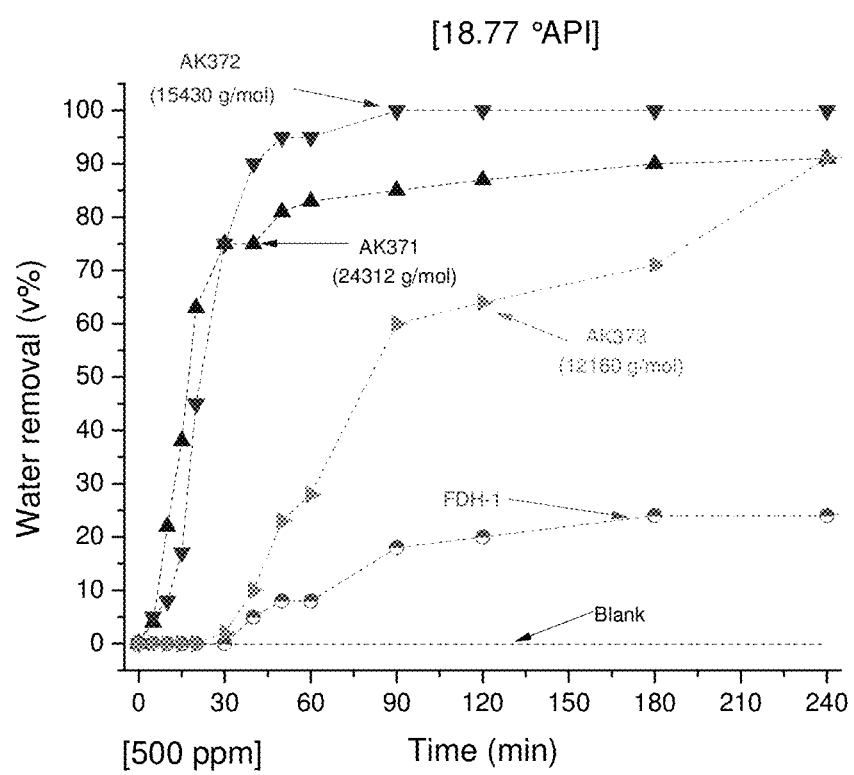
Figure 6:
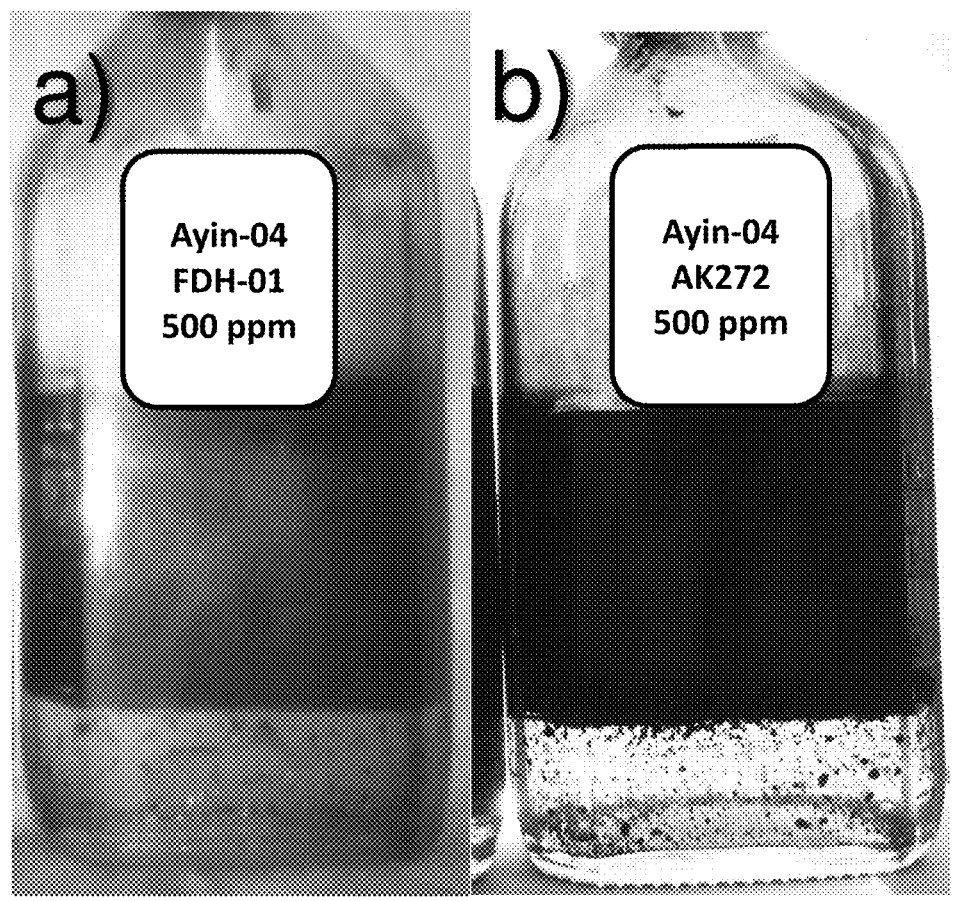
Figure 7:
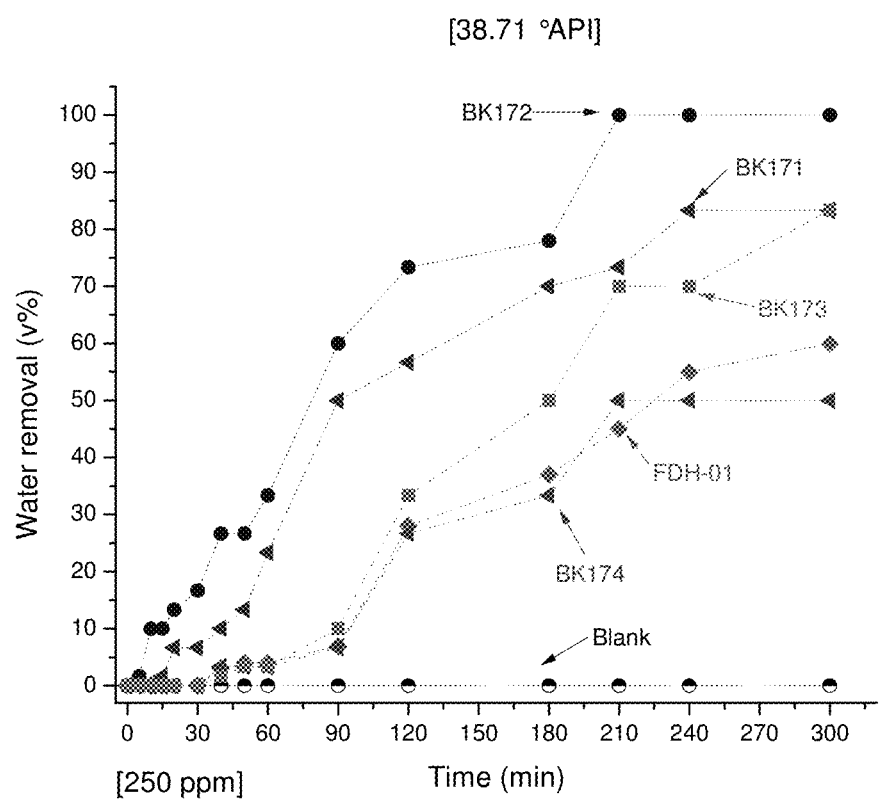
Figure 8:
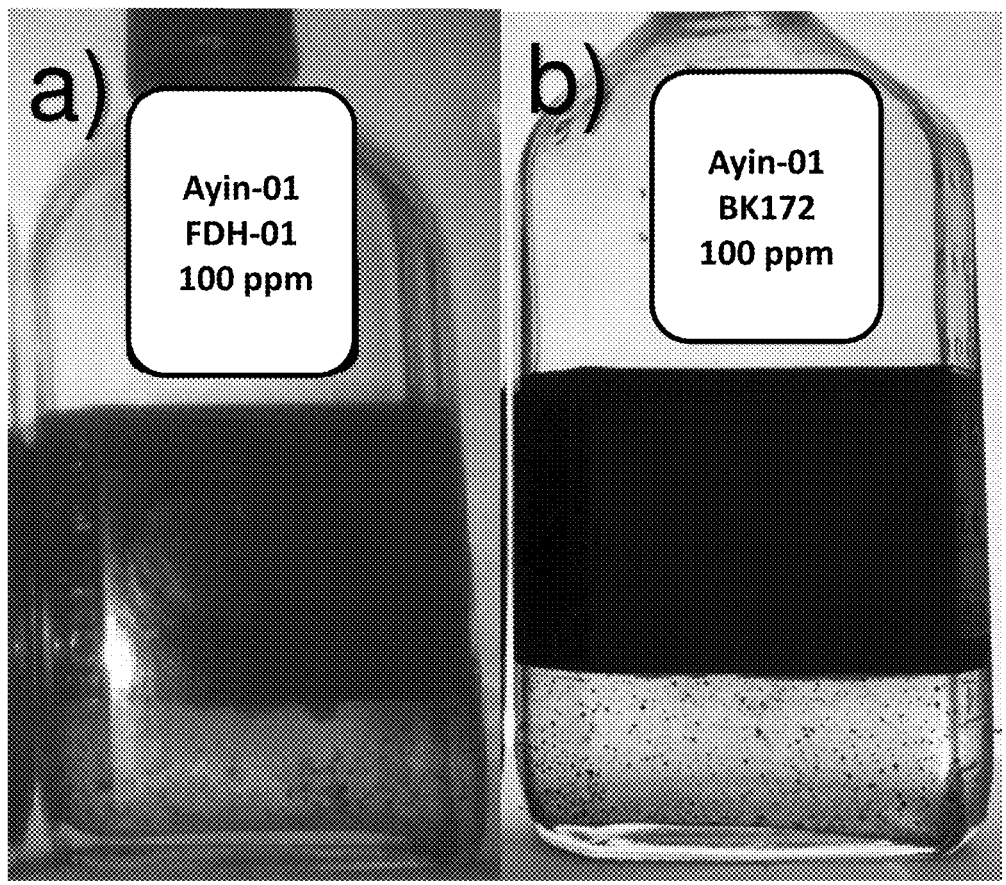

By way of demonstration, which does not imply any limitation, the results of the evaluation described above are reported in FIGS. 1, 2, 4, 5, and 7, whereas images of bottles after the evaluation are shown in FIGS. 3, 6 and 8.

The difference between the acrylic/aminoacrylic random copolymers AK271 and AK271-L, respecting to the synthesis method employed, by using a batch or a semi-continuous reactor, may be observed in FIG. 1. It is noted that at 1000 ppm the synthesized copolymer in semi-continuous reactor removed 100% of water from evaluated crude oil (12.31° API) in 20 min; whereas its analogous (synthesized copolymer by batch) reached until 2 h of evaluation. On the other hand, when the concentration is reduced at 500 ppm, both copolymers showed a water removal rate very similar, but the speed of water coalescence was greater in the sample synthesized in the semi-continuous reactor, because it reached a water removal of 95% at 2 h of evaluation, whereas the another one reached this value after 4 h of evaluation. In this FIG. 1 is observed that the blank cannot remove water, which indicates that the water/oil emulsion is colloidally stable.

Once observed that semicontin ous emulsion polymerization allows obtaining acrylic/aminoacrylic copolymers more efficient, in FIG. 2 is compared the AK271 copolymer with the commercial product FDH-1, at a concentration of 1000 ppm. It is important to remember that the FDH-1 formulation, widely used in the oil field, consists of the combination of four polyethers with various dehydrating properties. After the evaluation was carried out, it was observed that the acrylic/aminoacrylic copolymer was able to remove 100% of dispersed water in only 20 min, whereas commercial formulation FDH-1, based on conventional polyethers, just removed all the water after 2 h This results imply that the copolymer of this invention is more effective in a 60% compared to the commercial formulation at the same conditions. When products were dosed at 500 ppm, it was determined that the performance of random copolymers decreases, because it reached the 100% until 2 h of evaluation. However, the commercial product could not remove more than 20% of water throughout the evaluation. When commercial formulation FDH-1 is dosed at twice of concentration (1000 ppm), it behaved similar to copolymer at concentration of 500 ppm, both evaluated in crude oil of 12.31° API. In any case was noted spontaneous water removal from blank. In this way, the best performance of basis dehydrator of type acrylic is demonstrated, which combines in a single molecule the properties of a demulsifier (breakdown, coalescence and clarification of water phase).

Two phenomena may be observed in FIG. 3: firstly, the difference of water removal induced by the two products, being AK272 at 1000 ppm able to remove very fast 100 vol % of water from Ayin-09 crude oil (12.31° API); secondly and much more notorious, there is a remarkable difference between the quality of the removed water, which means that a greater clarification is observed in the bottle dosed with the acrylic/aminoacrylic copolymer. In contrast, when the, FDH-1 formulation is applied there is no a total cleaning of the removed aqueous phase.

Figure 4:
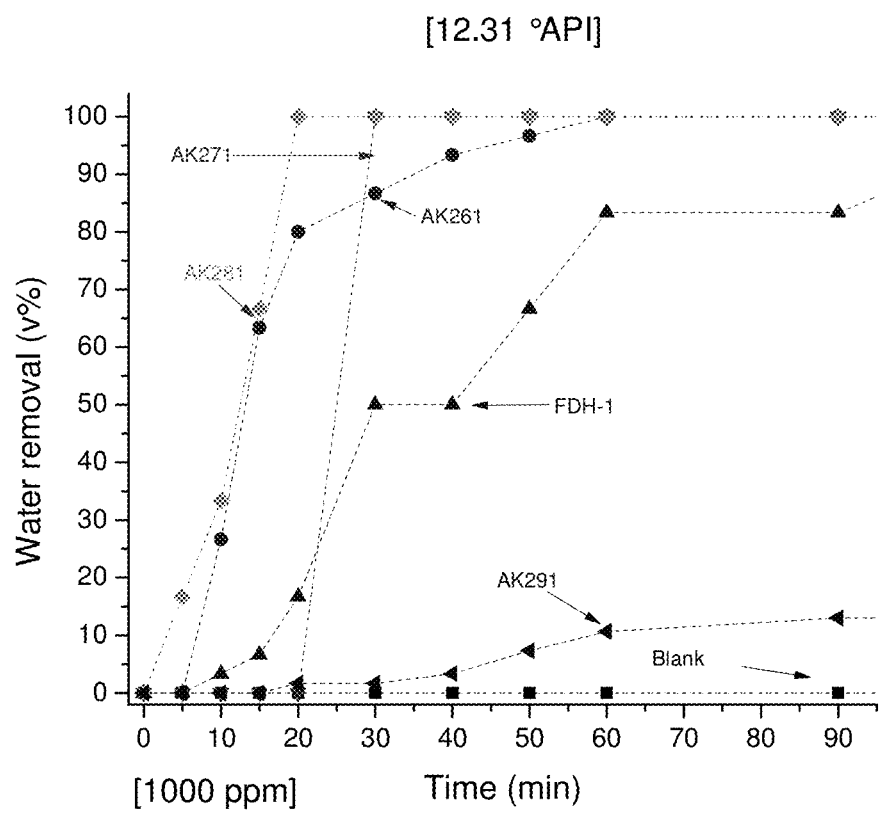

The dependence between the removal of water from crude oil of 12.31° API and the composition of a series of different acrylic/aminoacrylic random copolymers dosed at 1000 ppm is shown in FIG. 4. Regarding to AK281 copolymer, with 80 wt % of A-acrylic monomer and 20 wt % of aminoacrylic monomer, this compound displayed the best performance as dehydrating agent, removing 100% of water from crude oil at just 15 min: Its efficiency was followed by that of AK271 copolymer, with composition of A/K2 70/30 wt/wt; this copolymer removed all the water after 20 min of the evaluation. An intermediate behavior between the two samples early described is that of AK261 demulsifier, which has an intermediate coalescence rate between AK281 and AK271 copolymers, removing 100% of water at the first hour of evaluation. On the other hand, commercial product FDH-1 fails to reach 100% of water removal in less time than the copolymers mentioned above. AK291 copolymer, with the lowest composition of aminoalkyl acrylate (A/K2: 90/10 wt/wt), did not show good performance as dehydrating agent, barely removing 10% of water from evaluated crude oil. Therefore, there is an optimal chemical composition to carry out the dehydrating of crude oils, which would correspond to that of AK281 (A/K2: 80/20 wt/wt). Blank allowed validating the assessment, showing the high stability of water-in-oil emulsion throughout the evaluation. In spite of the stability of water-in-oil emulsion, AK281 acrylic-aminoacrylic copolymer, with a suitable composition and molecular mass, achieved a better water removal than the most commonly used polyether formulation.

In FIG. 5 could observe the effect that has the molecular mass of acrylic/aminoacrylic random copolymers over their performance as dehydrating agents, at a concentration of 500 ppm, in crude oil of 18.77° API (Ayin-04). Again, the blank allowed validating the test, showing that there is no removal of water induced by lack of colloidal stability during the test. It was observed that there is an optimal molecular weight for demulsifier copolymers, which corresponds to AK372 copolymer (15430 g/mol), which reached 100% of water removal at 90 min of evaluation; meanwhile, AK371 (24312 g/mol) and AK373 (12160 g/mol) converged at same time to remove 90 vol % of water from crude oil at 4 h of evaluation. These copolymers outperformed the commercial product FDH-1, formulation of commercial raw materials that reached to remove approximately 25 vol % of water.

In FIG. 6 shows that both products removed the same amount of water from Ayin-04 crude oil (18.77° API). Moreover, it is notable the marked difference in clarification of water removed in the crude oil by the chemical products evaluated, because it is observed in FIG. (6) the bottle dosed with the acrylic/aminoacrylic copolymer (AK272) that adequately cleans the aqueous phase, whereas in the case of the FDH-1 formulation, there is no a marked clarification of water removed.

FIG. 7 shows the effect by changing the type of alkyl acrylate on the copolymers, replacing A for B; likewise, it shows the effect that exists regarding molecular weight over the efficiency as dehydrating agents in light crude oil of 38.71° API (Ayin-01). A similar behavior similar to that reported in FIG. 4 was observed, because the BK172 sample is the one with the best performance as dehydrating agent, being the only one capable to remove 100% of water from light crude oil. Performance of BK-172 copolymer was followed by BK-171 and BK-173, which show a similar behavior and only removed 90 vol % of water. Finally, the formulation of commercial products FDH-1 and BK-174 copolymer revealed a similar performance, removing around 50% of water dispersed in the crude oil. There was no water removal from the blank.

The difference between copolymers base on alkyl acrylate/aminoalkyl acrylate and commercial product FDH-01 is observed again in FIGS. 8(a) and (b). Even if the chemical composition of amined product BK172 is changed, this demulsifier keeps its property as good clarifier of the water removed from Ayin-01 crude oil (38.71° API). In contrast, FDH-01 product does not clarify adequately the aqueous phase removed from crude oil. Again, the best performance of acrylic-aminoacrylic copolymers of controlled molecular mass is observed in light crude oil with respect to the properties of commercial demulsifiers commercially available.

The invention claimed is:
1. A method of dehydrating and demulsifying crude oils having a density of 10 to 40° API using random copolymers based on alkyl acrylate and aminoalkyl acrylate as dehydrating agents of crude oils, said method comprising adding an active composition containing the copolymer to crude oil in an amount to demulsify the crude oil, where the active composition is formulated as a solution comprising organic solvents, and where said random copolymer has the structural formula (2) and a molecular weight between 1000 and 180,000 g/mol

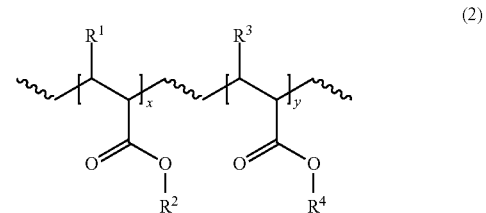

wherein:
$R^1$, $R^2$, $R^3$ and $R^4$ are independent radicals represented by the groups mentioned bellow:
$R^1$ and $R^3$=H (hydrogen), $CH_3$ (methyl);
$R^2$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), or $C_5H_{11}O_2$ (2-(2-methoxyethoxy)ethyl), the aliphatic chain may contain heteroatoms of the ether group, or aromatic rings or rings with heteroatoms of the ether type;
$R^4$=$CH_2NH_2$ (methylamine), $CH_2CH_2NH_2$ (2-ethylamine), $CH_2CH_2CH_2NH_2$ (3-propylamine), $CH_2CH$ (NH$_2$)$_2$ (2-dimethyl amino), (CH$_2$CH$_2$N(CH$_3$)$_2$) 2-(dimethyl amino)ethyl, (CH$_2$CH$_2$N(CH$_2$CH$_3$)$_2$), 2-(diethylamino)ethyl, (CH$_2$CH$_2$CH$_2$N(CH$_3$)$_2$), 3-(dimethylamino)propyl, or (C$_6$H$_{12}$NO) N-ethylmorpholine; wherein, x=is a number from 2 to 900;

y=is a number from 2 to 900; and "x" and "y" are in random sequences.

2. The method of dehydrating crude oils using random copolymers based on alkyl acrylates and aminoalkyl acrylates, as dehydrating agents of crude oils, according to claim 1, where the organic solvents in the active composition have a boiling point between 35 and 200° C.

3. The method of dehydrating crude oils using random copolymers based on alkyl acrylate and aminoalkyl acrylate, as dehydrating agents of crude oils, according to claim 1, where the organic solvents for formulation are selected from the group consisting of dichloromethane, methanol, ethanol, isopropanol, chloroform, benzene and its derivatives, toluene, xylene, turbosine and naphtha, and mixtures thereof.

4. The method of dehydrating crude oils using random copolymers, based on alkyl acrylates and aminoalkyl acrylates, as dehydrating agents of crude oils, according to claim 1, where the active composition comprises between 10 and 50 wt % of said copolymers.

5. The method of dehydrating crude oils using random copolymers based on alkyl acrylate and aminoalkyl acrylate as dehydrating agents of crude oils, according to claim 4, where the active composition is added to said crude oil at a concentration in a range of between 10 to 2000 ppm based on the amount of said crude oil.

6. The method of dehydrating crude oil and demulsifying crude oil according to claim 1, wherein R$^1$ is selected from the group consisting of methyl, ethyl, n-butyl, isobutyl, n-hexyl, iso-hexyl, 2 ethyl-hexyl, n-octyl, n-decyl, iso-decyl, n-dodecyl, n-octadecyl, 2-phenoxyethyl, 2-methoxyethyl, and 2-(2-methoxyethoxy)ethyl.

7. The method of dehydrating and demulsifying crude oil according to claim 1, wherein R$^1$ is selected from the group consisting of methyl, ethyl, n-butyl, isobutyl, n-hexyl, iso-hexyl, 2 ethyl-hexyl, n-octyl, n-decyl, iso-decyl, n-dodecyl, n-octadecyl, 2-phenoxyethyl, and 2-(2-methoxyethoxy)ethyl.

8. The method of dehydrating and demulsifying crude oil of claim 1, wherein R$^1$ is hydrogen, R$^1$ is n-butyl, R$^3$ is hydrogen, and R$^4$ is 2-ethylamino.

9. The method of dehydrating and demulsifying crude oil of claim 1, wherein R$^1$ is hydrogen, R$^1$ is hydrogen, R$^3$ is hydrogen, and R$^4$ is 2-(dimethylamino) ethyl.

10. The method of dehydrating and demulsifying crude oil of claim 1, wherein R$^1$ is hydrogen, R$^1$ is n-hexyl, R$^3$ is hydrogen, and R$^4$ is 3-aminopropyl.

11. The method of dehydrating crude oil according to claim 1, wherein R$^4$ is selected from the group consisting of methylamine, 2-ethylamine, 3-propylamine, 2-dimethylamino, and N-ethylmorpholine.

12. The method of dehydrating crude oil according to claim 6, wherein R$^4$ is selected from the group consisting of methylamine, 2-ethylamine, 3-propylamine, 2-dimethylamino, and (C$_6$H$_{12}$NO) N-ethylmorpholine.

13. A method of dehydrating and demulsifying crude oils having a density of 10 to 40° API using random copolymers based on alkyl acrylate and aminoalkyl acrylate as dehydrating agents of crude oils, said method comprising adding an active composition containing the copolymer to crude oil in an amount to demulsify the crude oil, where the active composition is formulated as a solution comprising organic solvents, and where said random copolymer has the structural formula (2) and a molecular weight between 1000 and 180,000 g/mol

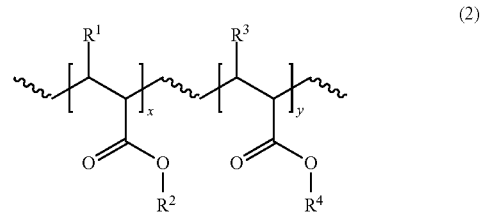

(2)

wherein:

R$^1$, R$^2$, R$^3$ and R$^4$ are independent radicals represented by the groups mentioned bellow:

R$^1$ and R$^3$=H (hydrogen), CH$_3$ (methyl);

R$^2$ is selected from the group consisting of methyl, ethyl, n-butyl, isobutyl, n-hexyl, iso-hexyl, 2 ethyl-hexyl, n-octyl, n-decyl, iso-decyl, n-dodecyl, n-octadecyl, 2-phenoxyethyl, and 2-(2-methoxyethoxy)ethyl, wherein the aliphatic chain may contain an aromatic ring;

R$^4$ is selected from the group consisting of methylamine, 2-ethylamine, 3-propylamine, 2-dimethylamino, 2-(dimethylamino)ethyl, 2-(diethylamino)ethyl, 3-(dimethylamino)propyl, and N-ethylmorpholine;

wherein, x is a number from 2 to 900;

y is a number from 2 to 900; and "x" and "y" are in random sequences.

14. The method of dehydrating crude oil according to claim 1, wherein R$^2$ is selected from the group consisting of methyl, ethyl, n-butyl, isobutyl, n-hexyl, iso-hexyl, 2 ethyl-hexyl, n-octyl, n-decyl, iso-decyl, n-dodecyl, n-octadecyl, 2-phenoxyethyl, and 2-(2-methoxyethoxy)ethyl.

* * * * *